United States Patent [19]

Gardella, Jr. et al.

[11] 4,230,978
[45] Oct. 28, 1980

[54] IMPULSE DRIVE SYSTEM

[75] Inventors: John F. Gardella, Jr., Bedford; George W. King, Concord; Eric A. Kolm, Brookline; Henry H. Kolm, Wayland, all of Mass.

[73] Assignee: Compugraphic Corporation, Wilmington, Mass.

[21] Appl. No.: 881,024

[22] Filed: Feb. 24, 1978

[51] Int. Cl.³ ............................................. G05B 11/00
[52] U.S. Cl. .................... 318/687; 318/135; 355/53; 355/42
[58] Field of Search ............... 318/687, 135; 310/12, 310/13, 154; 355/53, 40, 42, 95

[56] References Cited

U.S. PATENT DOCUMENTS

| | | | |
|---|---|---|---|
| 3,376,578 | 4/1968 | Sawyer | 310/13 |
| 3,493,160 | 2/1970 | Sumrall et al. | 310/13 |
| 3,569,718 | 3/1971 | Borner | 355/53 |
| 3,701,321 | 10/1972 | Lee | 310/13 |
| 3,735,231 | 5/1973 | Sawyer | 318/135 |
| 3,777,292 | 12/1973 | Fulenwider | 310/12 |
| 3,787,716 | 1/1974 | La France | 318/135 |
| 3,824,414 | 7/1974 | Laithwaite et al. | 310/13 |
| 3,832,610 | 8/1974 | Shimizu et al. | 318/135 |
| 3,839,664 | 10/1974 | Dirks et al. | 318/135 |
| 3,857,078 | 12/1974 | Sawyer | 318/135 |
| 3,867,675 | 2/1975 | Kitz et al. | 318/135 |
| 3,878,411 | 4/1975 | Nocito et al. | 310/12 |
| 3,904,897 | 9/1975 | Shichida et al. | 310/12 |
| 3,906,262 | 9/1975 | Shichida et al. | 310/13 |
| 3,940,676 | 2/1976 | Dudley | 318/687 |
| 3,999,107 | 12/1976 | Reuting | 310/12 |
| 4,049,983 | 9/1977 | Attwood et al. | 310/13 |

OTHER PUBLICATIONS

Brochure Describing "Xynetics 1000" Automatic Drafting System by Xynetics, Inc.

*Primary Examiner*—J. V. Truhe
*Assistant Examiner*—Eugene S. Indyk
*Attorney, Agent, or Firm*—Kenway & Jenney

[57] ABSTRACT

Disclosed is an impulse drive device that includes at least one stator having magnetic means to define an array of parallel spaced apart regions of magnetic field with a major component perpendicular to the plane of the stator; a slidor incorporating series-connected conductive strips in an array of similar spacing and orientation to the array of magnetic regions on the stator; and means for generating sequences of current pulses and for delivering those pulses to the conductive strips on the slidor. With appropriate timing and polarity, current pulses in the conductive strips on the slidor can be employed to both accelerate and decelerate the slidor with respect to the stator, thereby permitting rapid controlled movement of the slidor between predetermined positions in its plane. The pulse sequence generating means include a pulse generator and a controller, the latter operative to determine the number of pulses needed to achieve any desired slidor movement and to respond to a slidor position sensing system for achieving proper timing of each pulse. Preferably, servo control means are employed for final slidor positioning after completion of the pulse sequence.

44 Claims, 10 Drawing Figures

IMPULSE DRIVE SYSTEM

BACKGROUND OF THE INVENTION

The present invention relates to a system for precise, controlled movement of a usually planar object, such as a photographic or holographic transparency, and is especially useful in any situation requiring rapid random access to a position in a plane. Examples of such situations include photocomposition, microfiche data retrieval, digitally controlled plotting, computer generation of images, digitally controlled manufacture of electronic circuits and machine parts, and analysis of specimen samples supported in a planar device. As is apparent, several of these situations are direct to obtaining random access to information stored as an image in the plane.

In general, prior methods for obtaining such random access fall into two distinct categories: stroboscopic devices and stepping devices.

In stroboscopic devices, the plane is formed into a disk, drum or cylindrical belt and is rotated continuously. Access to the information at a specific locale is obtained by flashing one of several properly located stationary light sources at the proper instant of time to project or read the desired image while it is in motion.

In stepping devices, the plane is moved to the desired position by electro-mechanical driving devices, typically stepping motors.

Neither of these prior methods is fast enough for many present applications. The speed of stroboscopic devices is limited by image blur and available light. Moreover, continuous motion is not acceptable for many random access applications. The speed of stepping devices is limited by the high mechanical and electrical inertia associated with an iron armature and field pole structure. The driving force available is limited by magnetic saturation. Stepping motors also have poor transient response: they are unable to follow high stepping rates from the start, the they have long settling-down time when stopped. Moreover, the uncertainty in stopping position represents a sizeable fraction of a single step, thus requiring a large number of steps to be assigned to each unit space in order to achieve the required position accuracy. Even sophisticated efforts to improve this situation (by use of starting ramps and feedback control) have failed to adequately improve the transient response of stepping motors.

SUMMARY OF THE INVENTION

In view of the above discussion, it is a principal object of the present invention to provide a system employing non-mechanical means for rapidly moving a body to both accelerate and decelerate the body. It is a particular object to provide such a system for transporting a planar body simultaneously in the X and Y directions in order to provide rapid access to and precise positioning at any desired location in the plane of travel of the body. It is a further object to provide such a system in which it is feasible that the body to be transported have low mechanical and electrical inertia thereby facilitating the very rapid movement of the body between predetermined positions in the plane.

In one preferred form, an impulse drive device according to the present invention comprises a generally planar stator and an adjacent, aligned generally planar movable member (i.e., a "slidor"). Means are provided for delivering current pulses to the slidor and both slidor and stator are constructed to employ those pulses for accelerating and/or decelerating the slidor. In particular, the stator includes means for producing a plurality of regions of magnetic field extending substantially perpendicularly from a first stator surface, those regions being regularly spaced apart in the plane of the stator. The slidor is supported adjacent that first stator surface for movement in a direction parallel thereto and includes a plurality of electrically conductive segments distributed substantially parallel to each other and to the stator's regions of magnetic field, the segments being electrically connected and having a spacing substantially equal to the spacing of the stator's regions of magnetic field. Pulse sequence generating means are provided for generating sequences of current pulses and for delivering the same to the conductive segments so that the passage of current pulses through each of those segments interacts with an adjacent region of magnetic field to generate motion of the slidor in a direction parallel to the plane of the stator from any of a plurality of predetermined initial positions with respect to said stator to any of a plurality of predetermined final positions. The pulse sequence generating means include a pulse generator and a controller, the latter operative to determine the number of pulses needed to achieve any desired slidor movement and to respond to a slidor position sensing system for achieving proper timing of each pulse. Preferably, servo control means are employed for final slidor positioning after completion of the pulse sequence.

In particular preferred embodiments, the device is capable of simultaneous movement in both the X and Y directions. To achieve this, a second stator of similar design is provided, but having its regions of magnetic field oriented at an angle (e.g., 90°) to those of the first stator. The slidor is provided with electrically conductive segments on the surface facing the second stator and those segments have an orientation and a spacing matching that of the magnetic regions of the second stator. The current pulse generator supplies independent sequences of current pulses to the "X-drive" sgements on the slidor and to the "Y-drive" conductive segments, thereby permitting simultaneous and independent movement in the X and Y directions.

It will become apparent from the description below that various structural arrangements of the preferred embodiments contribute an efficient and high-speed impulse drive device and are within the scope of the present invention.

BRIEF DESCRIPTION OF THE DRAWINGS

Other objects, features, and advantages of the invention will appear from the following description of particular preferred embodiments, taken together with the accompanying drawings in which.

DETAILED DESCRIPTION OF PARTICULAR PREFERRED EMBODIMENTS GENERAL

Broadly, in the present invention a light weight, typically planar, movable member is positioned in parallel juxtaposition to a generally planar stator member for controlled precision movement. A typical goal of the precision movement is to rapidly and accurately position a predetermined area of the movable member in registration with a predetermined area of the stator member. (Other types of motion may be dictated by the end use of the system. Examples of such motion are rotation, oscillation, vibration, turning, slewing, lifting, etc.) The stator member is provided with a series of magnetic regions regularly spaced across the plane with each magnetic field oriented in the direction perpendicular to the plane. The movable member is formed of an electrically insulating material and has electrical conductor means disposed to be close to the adjacent stator member. This electrical conductor can be arranged as a number of segments or strips interconnected to form a continuous electrical path. The conducting strips have a regular spacing matching that of the stator's magnetic regions and are parallel to those regions.

Pulse sequence generating means supply current pulses to the movable member's conductive strips at times when each strip is at a predetermined position relative to a nearby magnetic region of the stator. With such registration, the current in each strip will flow in a direction perpendicular to the magnetic field. The resulting "Lorentz force" experienced by the movable member will be perpendicular to both the magnetic field vector and the current vector; i.e., the force will have a component parallel to the plane of the movable member and perpendicular to its conductive strips. For a given polarity of the magnetic field in which a conductive strip is located, the direction of the Lorentz force experienced by the slidor will depend upon the direction of current in the conductive strip. The slidor can thus be either accelerated or decelerated by a current pulse of proper direction at each registration of slidor conductive strips with stator magnetic regions. The increment in slidor momentum (whether acting to accelerate or decelerate the slidor) at each registration of slidor strips with stator magnetic regions can be tailored as needed by varying the current pulse amplitude and/or duration. The pulse sequence generating means include a pulse generator and a controller, the latter operative to determine the number of pulses needed to achieve any desired slidor movement and to respond to a slidor position sensing system for achieving proper timing of each pulse. Preferably, servo control means are employed for final slidor positioning after completion of the pulse sequence.

To achieve movement in both the "X" and "Y" directions, (i.e., to any matrix location of the plane of the movable member), the movable member is provided with conductive strips on each of its surfaces, the strips on the second surface being at an angle (e.g., 90) to those on the first. A second stator cooperates with the conductors on the second surface to drive the movable member, via the Lorentz force, in the Y direction simultaneously with, and independently of, the X direction drive produced by the first stator and the associated conductive strips on the movable member.

THE DRAWINGS

Figure 1:
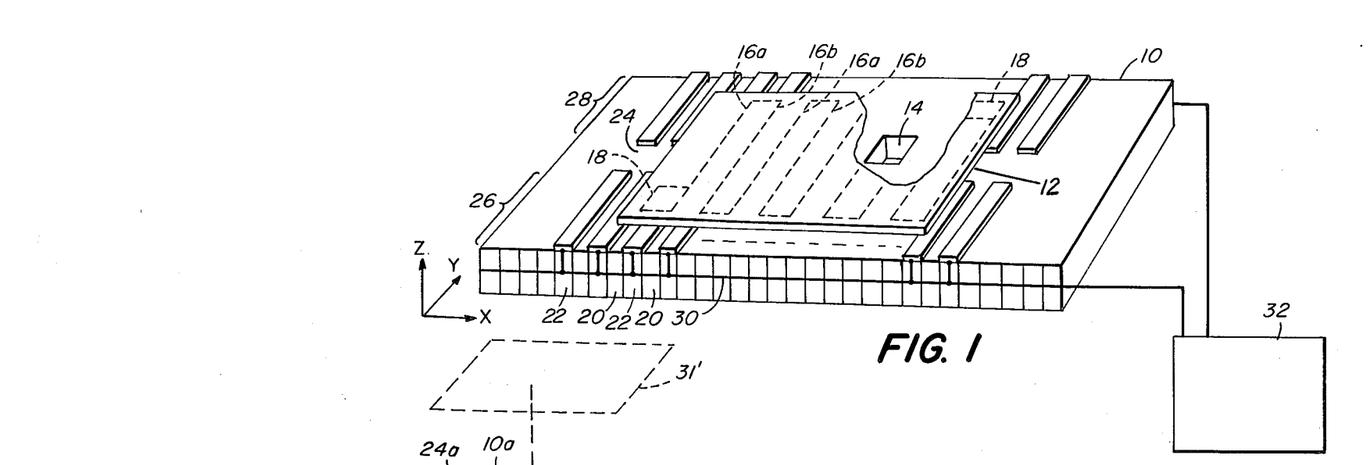
FIG. 1 is a partly schematic perspective view of an impulse drive device having a single stator so that slidor motion is limited to the X direction.

FIG. 1 is a simplified illustration of an impulse drive device constructed in accordance with the present invention. This figure is simplified both in that it omits details which are discussed with reference to other figures and in that it is an impulse drive device constructed for movement only in the X direction (as opposed to devices movable in the X and Y directions, as further discussed below). An initial discussion of this somewhat simplified arrangement will facilitate understanding of the more detailed discussions to follow.

In FIG. 1 there is shown a single stator 10 and a slidor 12 resting on the upper surface of the stator. The slidor 12 may be formed from an electrical insulator and, in the illustrated situation, would typically be visually transparent and would bear information at spaced-apart locations along the X direction. To gain access to information located at various positions on the slidor, it is necessary to move the slidor in the X direction to bring a specific region of the slidor into registration with an opening 14 provided in a central region of the stator 10. The double-headed arrow provided in FIG. 1 indicates the direction of the motion of the slidor 12. On the lower surface of the slidor 12, there is provided an electrical conductor of "meandering" or "serpentine" form to provide an array of series-connected, parallel conductive strips 16a, 16b, etc. At opposite ends, the array is in electrical contact with brushes 18, or other connection means, which make electrical contact with elements of the stator as the slidor moves with respect to the stator.

The stator is formed as an array of alternating permanent magnets 20 and iron pole pieces 22, the latter projecting upwardly above the upper surfaces of the magnets so as to be the elements that contact the brushes 18 on the slidor. Each pole piece 22 is interrupted in a central region of the stator by an insulating piece 24 in order to provide two zones of pole pieces, i.e., zones 26 and 28 which are electrically insulated from each other and which are disposed for contact with one or the other of the brushes 18, the latter having a width greater than the separation of adjacent pole pieces so as to be continuously in contact with the network of pole pieces. The pole piece segments of each zone are electrically connected in a parallel circuit (as at 30) and are connected to pulse sequence generating means 32, or "pulse sequencer", which includes a pulse generator and a controller. It is thus evident that a current pulse generated by the sequencer 32 can travel through the parallel circuit connection 30 to each of the pole piece segments in the zone 26 to reach the conductor on the lower surface of slidor 12 through the brush 18 in contact with at least one of those pole piece segments. The circuit is completed by contact of the other brush 18 with a pole piece segment in the zone 28. As is described in greater detail below, by appropriate arrangement of the regions of magnetic fluid produced by the stator and appropriate polarity of pulses delivered to the conductor on the lower surface of the slidor, the slidor 12 will experience a Lorentz Force in the X direction, which is produced by the interaction of the current in the Y direction (i.e., the current in the strips 16a, 16b, etc.) with the magnetic field emanating from the pole pieces in the Z direction.

Figure 2:
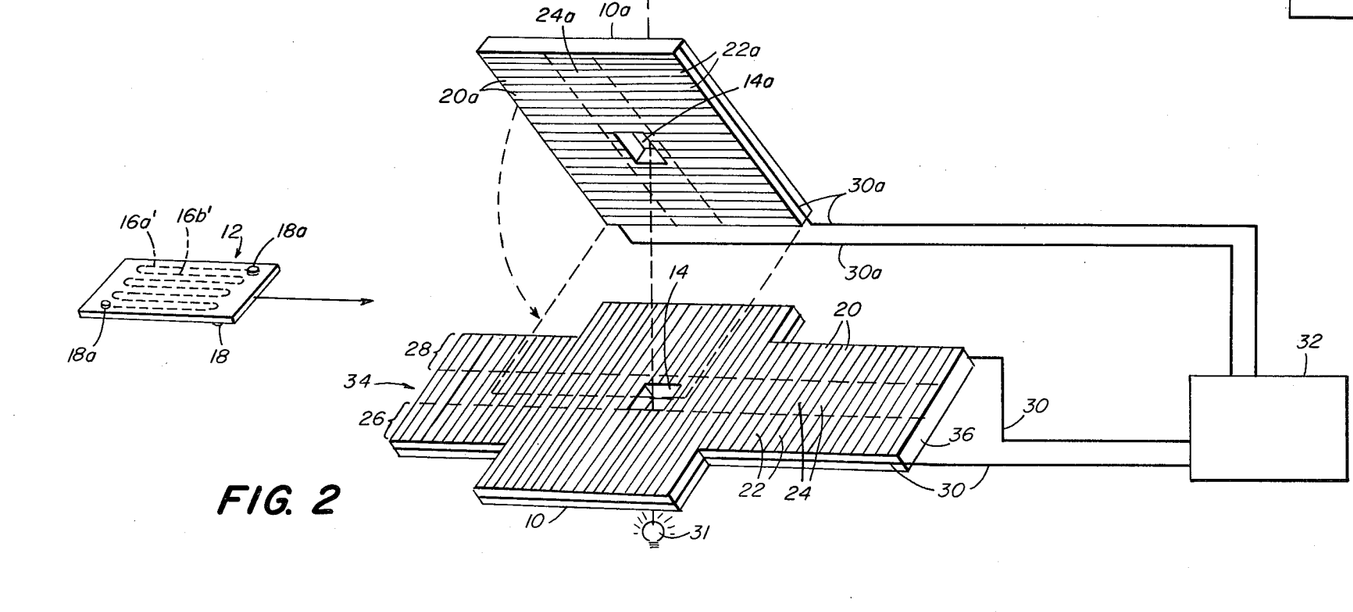
FIG. 2 is an exploded and simplified (i.e., many details omitted) partly schematic perspective view of an impulse drive device having upper and lower stators for driving the slidor in both the X and Y directions.

FIG. 2 schematically illustrates the "sandwich" arrangement of a slidor 12 between stators 10 and 10a in a device having capability of slidor movement in both the X and Y directions. The stator 10a has a construction entirely analogous to that of stator 10, but with its array of magnets 20a and pole pieces 22a disposed perpendicular to those of stator 10. (Non-orthogonal relationships of magnets 20 and 20a are possible and may even be preferred in certain applications). The slidor has a conductor on its upper surface connected to brush pads 18a and comprising conductive strips 16'a, 16'b, etc. that are parallel to pole pieces 22a.

The impulse drive device illustrated in FIG. 2 is set up to be suitable for use in photocomposition apparatus. Thus, as illustrated in greater detail in FIG. 3, the slidor may be of a transparent material with font characters at predetermined positions in its orthogonal X-Y grid. The stators are provided with central openings 14 and 14a. Those openings, in a photocomposition apparatus, would be aligned with a light source 31 which could be used to expose a medium 31' to be imprinted once the desired character of the font on the slidor was aligned with the openings. Pulse sequencer 32 is employed to generate sequences of current pulses of appropriate polarity and timing relative to slidor registration with stator pole pieces to drive the slidor, in a manner to be described in further detail below, in both the X and Y directions to bring the next desired font character into registration with the openings. (Naturally, other geometrical configurations of the system elements are possible. For example, in a system wher it is desirable to have a large area of the slidor continuously exposed, but movable in the X-Y plane, the slidor could include a "working portion" which contained the brushes 18 and 18a and electrical conductors 16a, 16b, . . . 16a', 16b', . . . That working portion would be sandwiched between appropriately shaped stators with the remainder of the slidor projecting from the sandwich.)

Referring again to FIG. 2, it will be seen that the "X" stator 10 extends in the X direction beyond the boundaries of the Y stator 10a. This arrangement permits convenient entry of a slidor into the space between the stators. Thus, a slidor can be mechanically or manually delivered to the edge of a projecting portion of the X stator (as at location 34) and then a predetermined sequence of X direction current pulses employed to automatically and rapidly move the slidor to a predetermined initial position relative to the stators (and to the openings 14 and 14a). This ability is a highly desirable feature in situations where any one of a plurality of slidors 12 would be used with a single set of stators. Thus, for example, in photocomposition equipment a number of slidors, each bearing a type font of different style, could be supported in a carousel, or other mechanical arrangement, for delivery of slidors to the location 34. With a suitable mechanical transport arrangement for the slidors, while a given slidor is in use its storage carriage could be transported to the opposite end 36 of the X stator 10. Then, when the given slidor was no longer needed, it could be stepped from the stator arrangement along the X direction to exit at location 36 while the next slidor, previously positioned at the input location 34, could simultaneously be stepped into the stator arrangement, thereby reducing "down time" associated with font changes.

Figure 3:
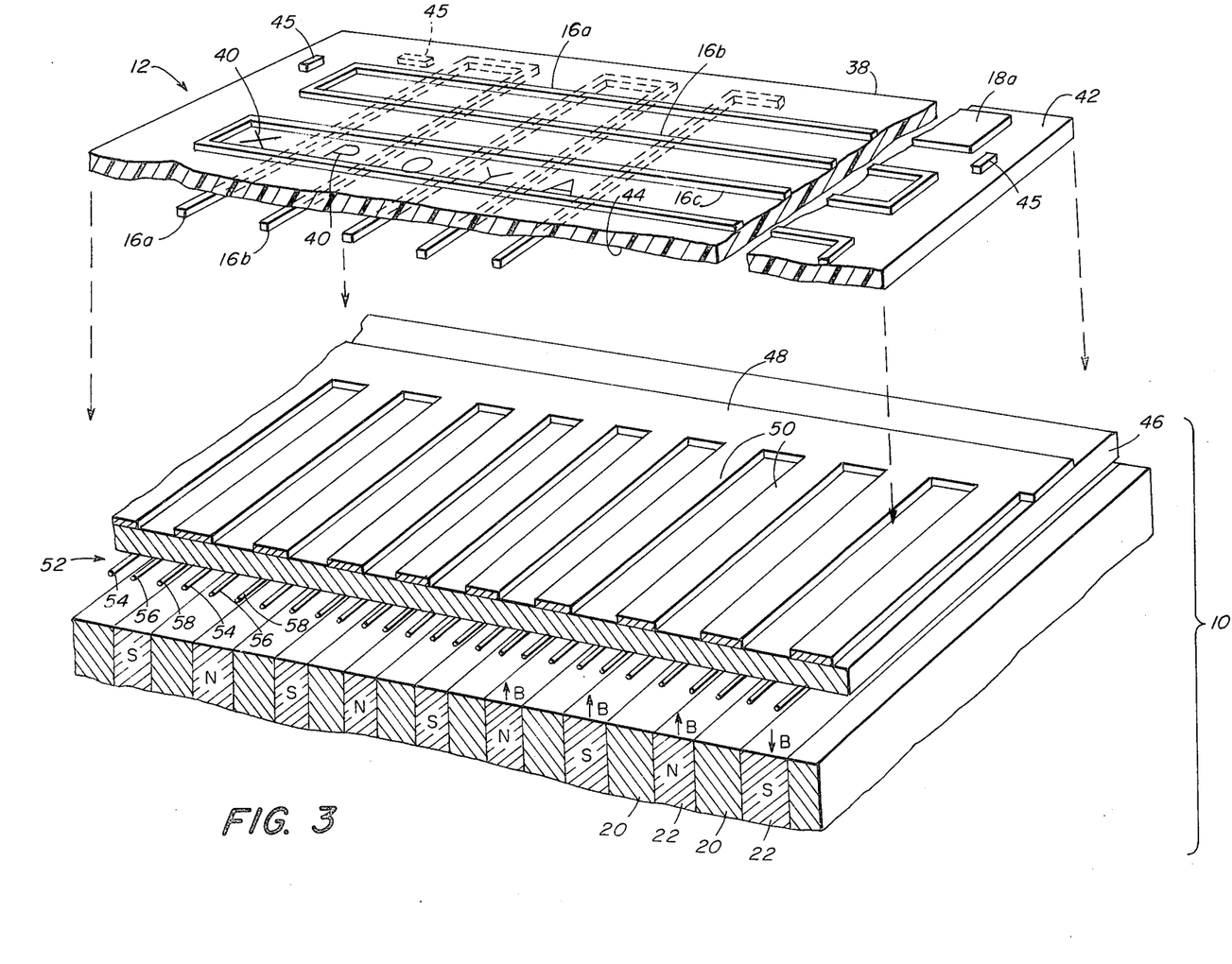
FIG. 3 is an enlarged, broken-away perspective view of a portion of the device in FIG. 2 showing the construction of the slidor and one of the stators of the device.

Referring to the more detailed view of FIG. 3, in the illustrated embodiment the slidor 12 may comprise a photographic transparency 38 bearing type font characters 40 in a rectilinear matrix. The matrix locations are defined by regions between the conductive strips 16'a, 16'b, etc. disposed on the upper surface 42 of the slidor and the perpendicular array of conductive strips 16a, 16b, etc. disposed on the lower surface 44. Small pieces 45 of magnetically susceptible material may also be provided on the slidor to act as a "magnetic detent", retaining the slidor in a stationary position betweeen the stators even when the system is not in operation. The pieces 45 also act to retain the moving slidor in alignment with the X and Y axes (i.e., to prevent $\theta$ errors). In one typical embodiment the spacing between adjacent conductive strips of each set would be approximately 6 mm. and the resulting 6 mm. $\times$ 6 mm. matrix locations would be the loci of font characters 40. Although the geometric alternatives are many, with such dimensions a suitable light weight slidor may be formed with a 12$\times$20 matrix capable of carrying characters for two type fonts.

As will be evident to those skilled in the art, the use of a serpentine conductive pattern on the slidor to provide a number of conductive strips 16a, 16b, etc. increases the total Lorentz force experienced by the slidor during each current pulse. In situations where even a greater force is desired (e.g., where system requirements dictate a more massive slidor), a plurality of serpentine conductors can be employed. For example, a layered slidor could employ aligned serpentine conductors separated by thin insulating films to increase the effective current involved in driving the slidor while maintaining a low brush current. This can be important since dissipation of heat from the brushes is presently believed to be a key factor in system design tradeoffs.

To facilitate the depiction of slidor and stator details, the upper stator 10a has been omitted in FIG. 3. Its construction would be identical to that of stator 10, discussed immediately below, but with the magnetic array, and the resulting magnetic fields, oriented perpendicular to that of stator 10.

The lower stator 10 comprises a series of solid, magnetically soft (i.e., large magnetic permeability and low magnetic remanence) metal bars (e.g., iron) which serve as pole pieces 22 for permanent magnets 20 disposed intermediate the bars. The permanent magnets are magnetized in the direction of the stator plane and perpendicular to the long axes of the pole pieces. The magnets are arranged such that alternate pole pieces become north and south magnetic poles (indicated with N and S in FIG. 3). The spacing between adjacent pole pieces 22 matches the spacing between the adjacent series of conductive strips 16a, 16b, etc. on the slidor. The magnetic field is essentially vertical above each pole piece, but with the magnetic field vector ("B") being oppositely oriented for the "N" and "S" pole pieces.

Figure 4:
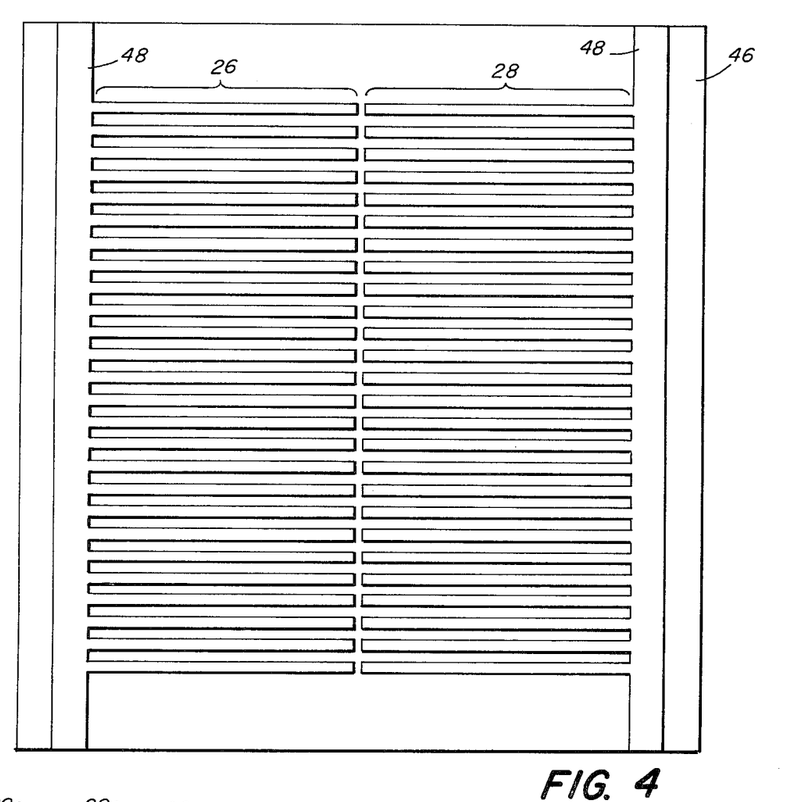
FIG. 4 is a plan view of the stator of FIG. 3.

In the preferred embodiment illustrated in FIG. 3, the stator 10 is itself a sandwich structure including a thin insulating sheet 46 which overlies the magnetic array formed from magnets 20 and pole pieces 22 and is releasably securable thereto (as by positioning pins, magnetic devices, adhesive, etc.; not shown). As is also evident from FIG. 4, arrays of electrically conductive strips are disposed on the upper surface of the member 46. Two main arrays 26 and 28 of the strips correspond to the arrays of conductive elements discussed above in connection with FIGS. 1 and 2. Each strip of each array is in electrical contact with a bus member 48 (identified with the element 30 in the simplified illustrations of FIGS. 1 and 2). In one preferred embodiment, the busses 48 and each conductive strip of both arrays 26 and 28 would comprise copper conductors on the insulating sheet 46.

The individual conductive strips of the arrays 26 and 28 will be elements that contact the brushes 18 on the slidor. They are thus the elements of the system most subject to wear and the provision of these elements on a relatively inexpensive and easily replaced insulating member 46 (as opposed to being formed integrally with the underlying magnetic structure) can simplify both construction and maintenance of the device.

Referring again to FIG. 3, it will be seen that each strip 50 of each array 26 and 28 has a width substantially equal to the width of each pole piece 22 and, when the member 46 is properly positioned in the stator structure, each conductive strip 50 is substantially aligned with a pole piece 22.

An array of electrical position sensing conductors (indicated generally at 52) is provided on the lower surface of the member 46. The spacing between adjacent conductors of this array is one-third that of the center-to-center spacing of the conductive strips 50. The conductors of the array 52 are disposed parallel to the pole pieces 22 and to the conductive strips 50. The array 52 is arranged as three separate sets of conductors. In the illustrated embodiment, the conductors 54 of a first set underlie a strip 50 near one edge of that strip. The conductors 56 of a second set underlie a strip 50 near the other edge of the strip. The conductors 58 of a third set are substantially centered intermediate an adjacent pair of strips 50. As is discussed in further detail below, provision of multiple sets of conductors provides for accurate sensing of the position of a slidor moving with respect to the stator 10.

As will be evident to those skilled in the art from the discussion below of the position sensing operations, the number of separate sets of sensing conductors in the conductive array 52 can be changed at will with appropriate changes in the logic circuitry receiving as inputs induced voltages from those conductors. Although a very large number of such groups of conductors finely spaced would provide very highly accurate position information, such an arrangement would render construction of the stator 10 more difficult and expensive. Furthermore, in the best mode of practicing the invention as presently perceived, a three-phase array of sensing conductors 52 should be adequate for most applications of the device.

Figure 5:
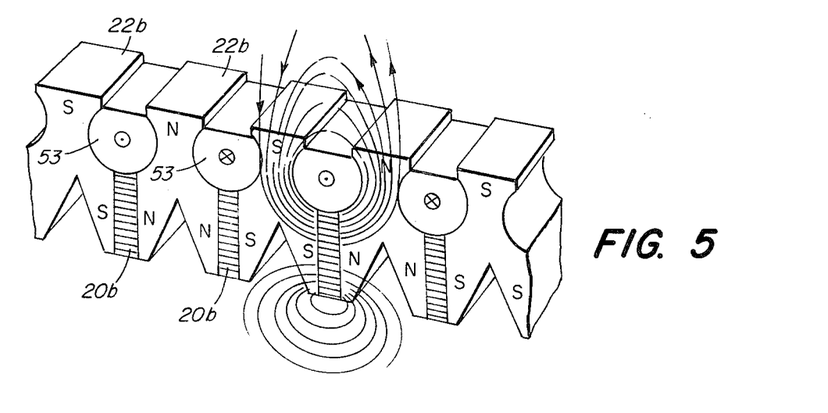
FIGS. 5 and 6 are fragmentary views of alternative stator constructions.
Figure 6:
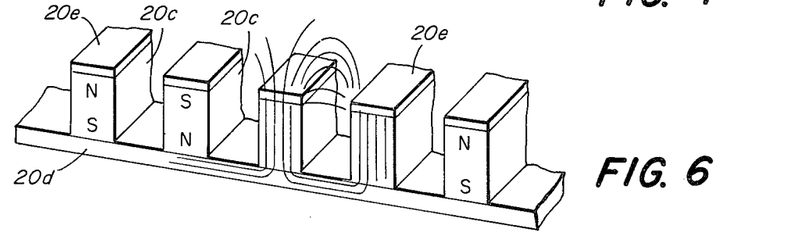

FIGS. 5 and 6 illustrate alternative stator constructions. In FIG. 5 the pole pieces 22b are specially shaped in cross-section to facilitate the development of a magnetic field of the desired intensity and configuration. Additionally, insulated current conductors 53 are provided intermediate adjacent pole pieces 22b and above permanent magnets 20b. Current supplied to the conductors with suitable polarity (in FIG. 5 a dot indicates current out of the plane of the drawing and an X indicates current into the plane of the drawing) causes the magnetic flux to be driven through the iron pole pieces 22b and to further modify (e.g., intensify or shape) the magnetic field that would normally be produced by permanent magnets 20b.

In FIG. 6 permanent magnets 20c serve as the pole pieces and are magnetized in a direction perpendicular to the plane of movement of the slidor. The magnets are mounted on an iron base plate 20d, which serves to provide a magnetic flux return path, and a copper strip 20e disposed on the upper surface of each magnet serves as a contact for the brushes of the slidor and also affords protection against demagnetization of the permanent magnets.

Another consideration in the fabrication of the stator 10 involves the prevention of demagnetization of the permanent magnets, which could result from current pulses supplied to the slidor. This demagnetization can be prevented by eddy currents which prevent the field from penetrating into the permanent magnets. If the permanent magnets have adequate electrical conductivity, demagnetization will not occur. If the conductivity is not adequate, additional eddy current shielding can be provided by attaching strips 20e of FIG. 6 or strips 50 of FIG. 3 of high conductivity material (e.g., copper) to the surface of the permanent magnets.

The operation of the impulse drive device illustrated generally in FIGS. 1, 2 and 3 may now be described. For clarity, only movement in the X direction will be considered. In the embodiment of FIGS. 2 and 3, simultaneous movement in the Y direction, independent of the movement in the X direction, would would take place in an analogous manner.

When the slidor is in a position such that its array of parallel conductors 16a, 16b, etc. is in registration with pole pieces 22 of stator 10 a current flowing through the conductors will produce a transverse impulse (referring to FIG. 3, either left or right, depending on the current direction) because of the Lorentz force. As an example, consider the situation where it is desired to move the slidor seven matrix positions in the X direction from a predetermined initial position. A sequence of current pulses of proper synchronization with the registration of the slidor with the lower stator 10 and of proper polarity is employed to first accelerate the slidor and then decelerate it.

Figure 7:
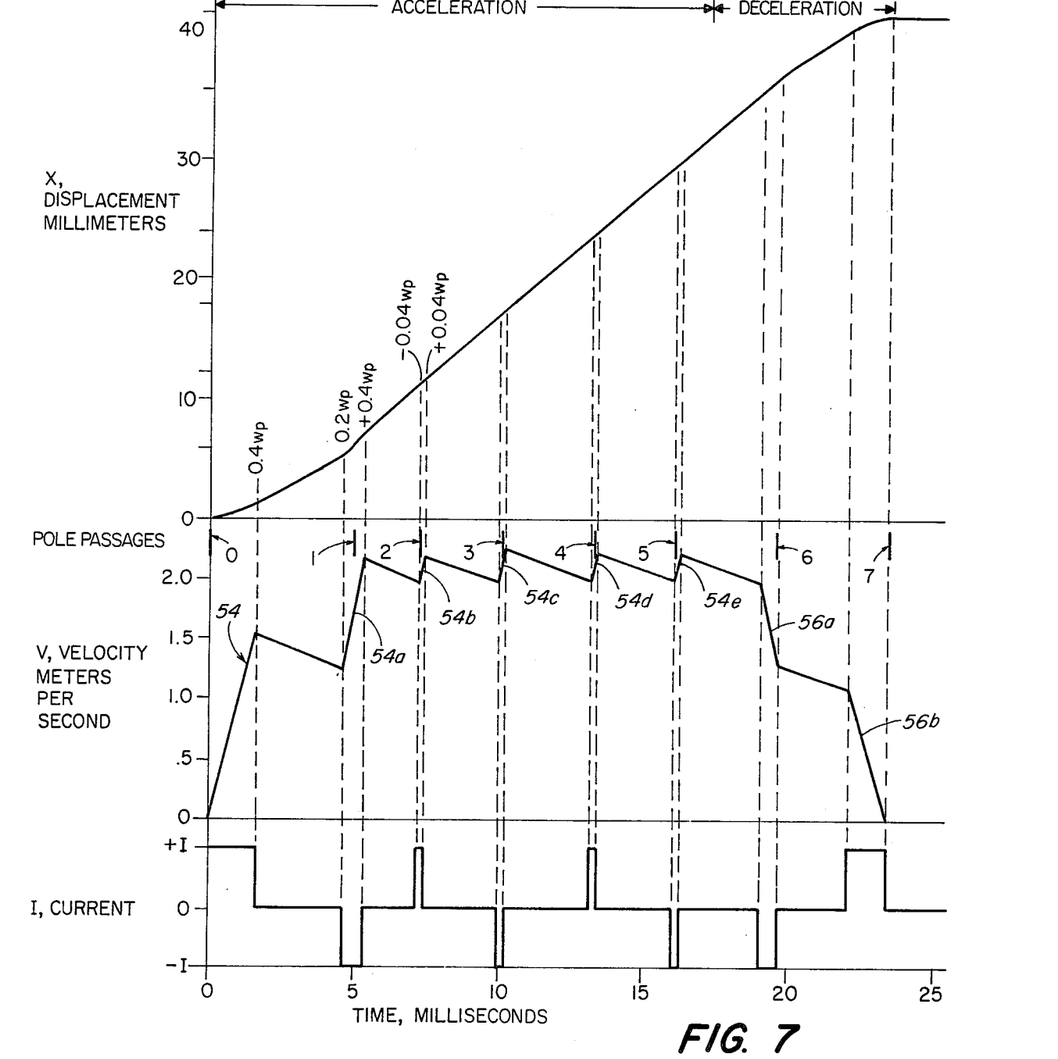
FIG. 7 is a diagram illustrating the sequence of events in movement of the slidor seven increments in the X direction.

This is illustrated graphically in FIG. 7 where the slidor displacement "X", the slidor velocity "V", the current "I" supplied to the slidor, and instants of slidor/stator registration (i.e., "pole passages") are plotted as a function of time. With the current conductors 16a, 16b, etc. aligned with pole pieces 22, the first current pulse at time O imparts an increment of momentum to the slidor thereby accelerating it. This is indicated by the sloped portion 54 of the velocity graph coincident in time with the first current pulse. Current pulses at pole passages 1-5 alternate pulse direction because of the alternating magnetic polarity of the pole pieces. Each of the pulses thus imparts further increments of momentum to the slidor (as indicated at sloped portions 54a-54e in the velocity graph). It will be noted, however, that the maximum velocity is achieved after the momentum increment accompanying pole passage 1. The current pulses at pole passages 2-5 are tailored in amplitude and duration to simply maintain that desired speed which may become slightly reduced owing to friction. The subsequent current pulses (i.e., at pole passages 6 and 7) are chosen to have a direction such that the increments of momentum will be of a reverse orientation, thereby decelerating the slidor. These decelerations are indicated at 56a-56b in the velocity graph.

It will be noted that each current pulse is slightly retarded with respect to the "dead center" registration of the slidor conductors 16a, 16b, etc. with pole pieces 22 during the accelerating and velocity sustaining pole passages (i.e., pole passages 0–5) and is advanced with respect to dead center registration thereafter (i.e., pole passages 6 and 7). This timing of the current pulses assists in countering any axial rotational displacement of the slidor relative to the stator.

The timing of pulses is accomplished on the basis of slidor position information which could be obtained by any suitable sensing means (inductive, capacitive, optical, etc.). One convenient position sensing means would simply involve the provision of the array 52 of sensing wires (see FIG. 3) located on the lower surface of stator element 46. A high frequency carrier current passing through the slidor conductors will induce a voltage in the sensing wires. The amplitude of this induced voltage varies substantially sinusoidally as the slidor moves along the X direction. If the carrier frequency is high compared with the rate of current pulses which drive the slidor, there will be no detrimental interaction between the driving system and the position sensing system. By providing a plurality of sets of sensing wires (three sets in the illustrated embodiment), analysis of the phase relation of the sinusoidal output from each of the sets can give precise information as to the position of the slidor at any instant.

Figure 8:
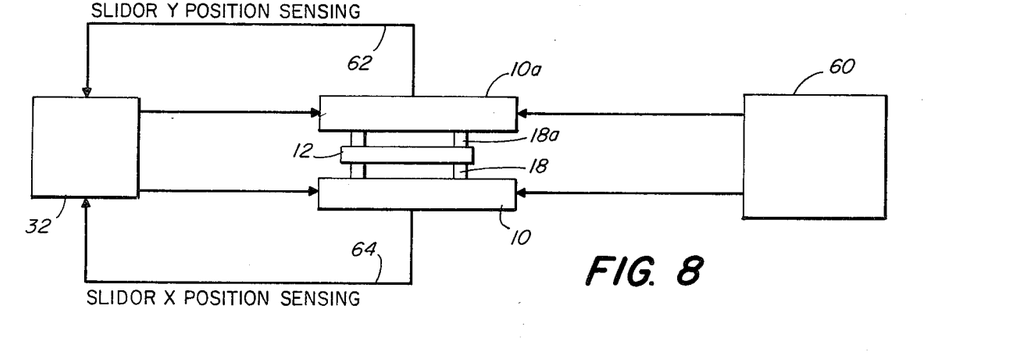
FIG. 8 is a block diagram of an impulse drive device constructed in accordance with the present invention.

The entire impulse drive system is illustrated in the block diagram of FIG. 8. The pulse sequencer 32 delivers current pulses of suitable polarity and duration to the X and Y stators for transmission through contact brushes 18, 18a to the slidor. A high frequency generator 60 delivers its output to the stators for similar transmission through the contact brushes to the slidor. The induced voltage in the sensing wires is an output from each of the stators and is delivered, via conductors 62 and 64, as an input to the pulse sequencer 32. The pulse sequencer uses the varying voltage appearing on leads 62 and 64 to appropriately time the Y and X current pulses in the manner described above.

Figure 9:
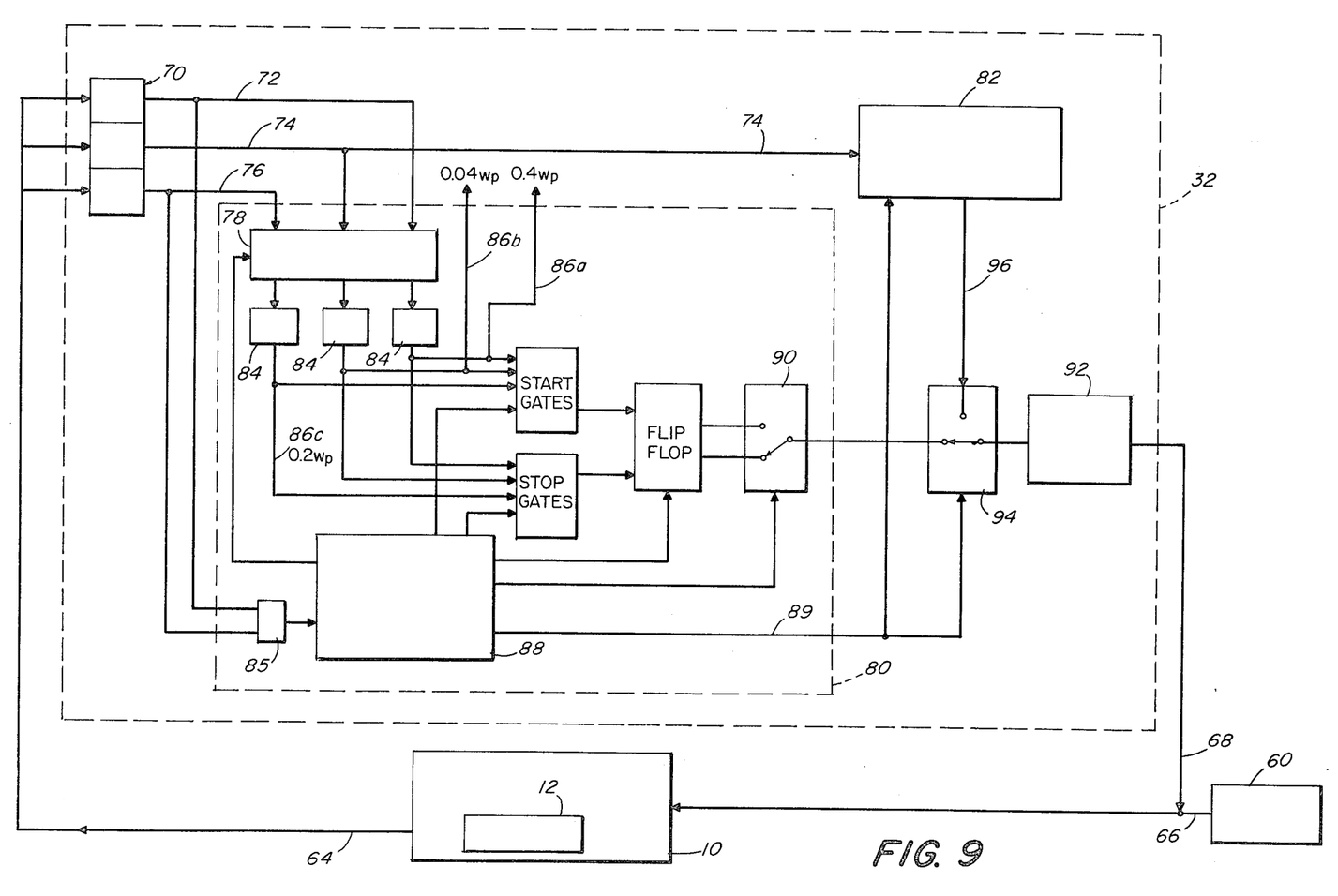
FIGS. 9 and 10 schematic diagrams of elements of one embodiment of a pulse sequence generating circuit suitable for use in the device of FIG. 8.
Figure 10:
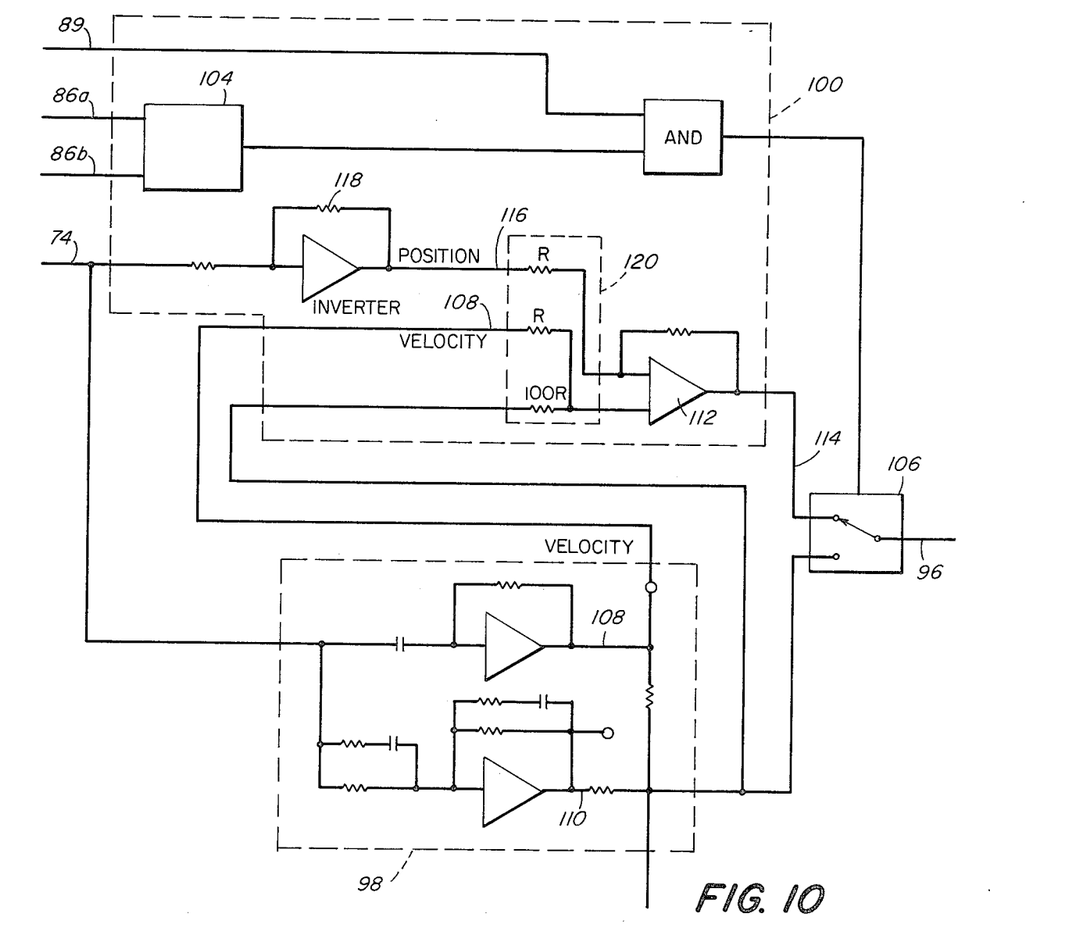

One suitable pulse generation and control arrangement is illustrated in FIGS. 9 and 10. Because the entire pulse sequencer 32 would incorporate substantially identical X and Y subsystems, for simplicity only the X-drive pulse generation and control circuitry is illustrated in FIGS. 9 and 10.

Referring first to FIG. 9, it will be seen that both the high frequency signal from source 60 (appearing on lead 66) and the output from the pulse sequencer (appearing on lead 68) are delivered to the stator 10 for passage through the slidor 12, in the manner described above. The high frequency signal induces varying voltages on the three series of conductors 54, 56 and 58 (see FIG. 3) of the stator. The output of those sensing conductors serves as an input to the pulse sequencer as indicated schematically by the lead 64. The signals from those three sets of sensing conductors (indicated as "left", "center", and "right" sets of sensing wires, respectively) are demodulated in demodulator 70, the output of the demodulator for each of the three sensing wires appearing on leads 72, 74, and 76, respectively. The signal on lead 74 is proportional to X displacement from the pole center and zero when the slidor conductors are centered over the pole pieces of the stator. This signal thus forms an input to a servo unit 82, which controls final positioning of the slidor as discussed below.

By choosing appropriate proportions of the voltages on lines 72, 74, and 76, voltage envelopes which pass through zero at any desired position of the slidor relative to the stator can be synthesized. For example, in a system having a pole piece width $w_p$ of about three millimeters and a pole pitch of about six millimeters, adding twice the voltage of lead 74 to the voltage of lead 72 (using switched matrix 78) can give an output that passes through zero at about 0.2 $w_p$. Hence, comparators 84 having properly matrixed inputs can produce output transitions for any slidor location including ±0.4 $w_p$, ±0.2 $w_p$, and ±0.04 $w_p$. Comparator 85 produces a two level signal which indicates the polarity of the magnetic pole region nearest the center of the slidor conductors at any instant.

The typical generation of a single pulse involves the starting of the pulse from the 0.04 $w_p$, 0.2 $w_p$ or 0.4 $w_p$ transitions on conductors 86 which are inputs to a "flip-flop" via the "start" gates, which are under the control of sequence control unit 88. The end of the pulse is derived similarly via the "stop" gates. Proper polarity of the output pulse is accomplished by the polarity switch 90 as a function of the direction of motion and magnetic pole polarity as determined by the unit 88. Thus, the sequence logic control unit is essentially a microprocessor that determines which signal to use for start and stop, for polarity, for reset, and for initialization. A power amplifier 92 raises the logic level pulse to the appropriate power level for a given system before the pulse is delivered to lead 68 for delivery to the stator/slidor.

A sequence of pulses, such as shown in FIG. 7, is indicated by a digital command to the logic and sequence program memory 88 giving the direction and number of pole centers to be traversed. Read only memories in unit 88 provide the start and stop sources. That is, conductors 86a, 86b, or 86c are required for all pulses in the desired sequence. After the start of the first pulse, the position of the slidor controls the start and finish times as shown at 55 in FIG. 7.

The arrangement of FIG. 9 as described to this point for generating a position-controlled sequence of pulses could be suitable for any application that does not require stopping of the slidor at a precisely known location. For any given movement of the slidor in the X direction (i.e., any given number of pole passages), it cannot be assured that the velocity will be zero when the slidor conductors are centered with respect to the stator pole pieces at the final pole passage. To guarantee precise stopping of the slidor at the desired location, therefore, the servo control amplifier 82 is provided. A switch 94 selects the output of unit 80 as the input to power amplifier 92 until a signal from the control unit 88, based upon information as to how close the slidor is to the final pole center, the signal on lead 89 causes the switch 94 to connect the output from the servo control amplifier (appearing on lead 96) to the input of power amplifier 92.

Referring now to FIG. 10, it will be seen that the servo control amplifier 82 comprises a position servo control amplifier 98, a velocity control amplifier 100, and a selector switch 106. In the preferred embodiment, both the position unit 98 and the velocity unit 100 are employed to rapidly and precisely bring the slidor to its desired final position. In that embodiment, the velocity servo initially controls the approach to the last pole for slidor positions between 0.4 $w_p$ and 0.04 $w_p$, at which point the signal on lead 86b causes flip flop 104 to provide a control signal throwing switch 106 to position servo.

The position servo has two channels, one incorporating the differentiator to produce a signal proportional to velocity on lead 108 and another signal which is proportional to position X on lead 110. With this arrangement unit 98 becomes the control amplifier of a high gain, high speed velocity damped position servo when switches 106 and 94 connect the signals produced on leads 108 and 110, via lead 96, to the power amplifier.

With a proper choice of input signals to flip flop 104 in the velocity servo 100, the switch 106 will connect the output of velocity servo 100 to the lead 96 between $0.4 w_p$ and $0.04 w_p$ in the last pulse of a sequence. During this period of time, the servo loop is closed via summing amplifier 112 and its output conductor 114. The system now functions as a velocity servo because the analog velocity voltage on the position servo output lead 108 is the controlled variable. Hence, a command voltage on lead 116 will cause the analog velocity to follow this command. The action of this servo loop is to reduce the error signal at the output of the amplifier 112 to zero.

Velocity control approach is achieved by driving the conductor 116 with an appropriate function of the position voltage on the conductor 74. This is done through an inverting amplifier whose gain is controlled by resistor 118. Constant deceleration dictates that the velocity during the approach to the center of the last pole follow the relation $v = \sqrt{2aX - v_O^2}$, where $v_O$ is the entering velocity at $X = 0.4 w_p$, a equals acceleration, and X equals distance from the pole center. Such a square root relation is conveniently provided by use of a non-linear resistor network, that is the resistor 118.

The 100R part of the resistor group 120 assures that there will be some velocity when the slidor is at $0.04 w_p$ when the position servo control 98 takes over.

From the above discussion of a preferred embodiment, it will be seen that the total system is an amalgam of analog and digital concepts. Thus, although there is a continuous sensing of slidor position, that information is used to control the beginning, amplitude, and ending of discrete pulses only at the times of substantial registration of the conductors on the slidor with the pole pieces on the stator.

Naturally, many modifications of the illustrated embodiments are possible without departing from the scope of the present invention. For example, even in a device where translatory motion is required (as opposed to rotation, vibration, etc.), there may be applications where it is not necessary to bring the slidor to rest at a precise position. Even in the photocomposition field, used above to illustrate a preferred environment of the present invention, it is possible to merely slow the slidor as it passes through the desired position at which time a light source could operate to properly expose the font character then passing through the desired position. In such a system, the position control servo could be eliminated and the velocity control servo appropriately modified to maintain the slidor at the desired speed as it passes through or near the zero position.

In various end use environments of the impulse drive device it may be desirable to have X and Y stators of differing magnet spacing, to always return the slidor to an X and/or Y reference point before moving to the next desired matrix location, to move the slidor stepwise in either the X or Y direction (i.e., decelerate and/or stop at intermediate points), etc.

While particular preferred embodiments of the present invention have been illustrated in the drawings and described in detail herein, other embodiments are within the scope of the invention and the following claims.

We claim:

1. An impulse drive device comprising
a generally planar stator including means for producing a plurality of regions of magnetic field extending substantially perpendicularly from a stator first planar surface, said regions being regularly spaced apart in the plane of said stator,
a generally planar movable member supported parallel to and perpendicular displaced from said stator first planar surface for movement in a direction parallel thereto, said movable member including a plurality of electrically conductive segments distributed substantially parallel to each other and to said regions of magnetic field, said segments being electrically connected and having a spacing between immediately adjacent segments in the plane of said movable member substantially equal to the spacing of said regions of magnetic field; and
pulse sequence generating means for generating sequences of current pulses and for delivering the same to said plurality of electrically conductive segments so that the passage of current pulses through each of said plurality of segments interacts with adjacent ones of said plurality of regions of magnetic field to generate motion of said movable member parallel to the plane of said stator from any of a plurality of predetermined initial positions of said movable member with respect to said stator to any of a plurality of predetermined final positions of said movable member with respect to said stator.

2. The impulse drive device of claim 1 wherein each sequence of current pulses has a first portion in which each pulse has a first polarity such that its interaction with said regions of magnetic field accelerates said movable member, and a second portion in which each pulse has an opposite polarity such that its interaction with said regions of magnetic field decelerates said movable member.

3. The impulse drive device of claim 2 further including servo control means for final positioning of said slidor following the final pulse of said sequence.

4. The impulse drive device of claim 1 further including means for sensing the position of said plurality of electrically conductive segments relative to said plurality of regions of magnetic field and providing output signals relating thereto; said pulse sequence generating means including a pulse generator and a controller, said controller being connected to receive said output signals as in input, and to cause said pulse generator to generate the current pulses of the sequence only at times of predetermined registration of each of said electrically conductive segments with one of said regions of magnetic field.

5. The impulse drive device of claim 4 wherein said position sensing means comprise a plurality of series of spaced apart electrical conductors supported on said stator parallel to said elongate regions of magnetic field and having substantially the same spacing, means for supplying alternating current to said plurality of electrically conductive segments on said movable member at a frequency substantially greater than the frequency of current pulses in any of said sequences of current pulses, and means for sensing changes in an electrical parameter of conductors of each series on said stator in response to said high frequency current as said movable member moves with respect to said stator.

6. The impulse drive device of claim 4 wherein each sequence of current pulses has a first portion in which each pulse has a polarity such that its interaction with said regions of magnetic field accelerates said movable member, and a second portion in which each pulse has a polarity such that its interaction with said regions of magnetic field decelerates said movable member, said pulse sequence generating means operative, in response to the output signals of said means for sensing the position of said movable member, for each sequence to generate the individual current pulses of the first portion when each of said electrically conductive segments is in registration with a trailing portion, in the direction of travel of said movable member, of a region of magnetic field and to generate the current pulses of the second portion when each of said electrically conductive segments is in predetermined registration with the leading portion of a region of magnetic field.

7. The impulse drive device of claim 6 further including servo control means for final positioning of said slidor following said second portion of said sequence.

8. The impulse drive device of claim 7 wherein said servo control means include velocity servo control means, position servo control means, and means responsive to said position sensing means for rendering operative either said velocity servo control means or said position servo control means.

9. The impulse drive device of claim 1 wherein said plurality of electrically conductive segments on said movable member are connected to each other to form a series electrical connection.

10. The impulse drive device of claim 1 further including contact brush means supported on said movable member in electrical contact with said electrically conductive segments.

11. The impulse drive device of claim 10 wherein said contact brush means are disposed outside of the geographical region of said plurality of electrically conductive segments.

12. The impulse drive device of claim 1 wherein said stator includes an array of alternating permanent magnets and pole pieces, said regions of magnetic field extending substantially perpendicularly from said pole pieces.

13. The impulse drive device of claim 12 further including means for electromagnetically modifying the magnetic fields produced by said permanent magnets.

14. The impulse drive device of claim 12 further comprising eddy current shielding means for preventing demagnetization of said permanent magnets by the pulsed field from said plurality of conductor segments on said movable member.

15. The impulse drive device of claim 1 wherein said stator comprises an array of spaced-apart permanent magnets supported on a backing plate formed from a material having a high magnetic permeability, each said permanent magnet having a magnetization substantially perpendicular to the plane of movement of said movable member, each said permanent magnet oriented such that adjacent permanent magnets have surfaces facing said movable member which have opposite magnetic polarities.

16. The impulse drive device of claim 15 further including eddy current shielding means for preventing demagnetization of said permanent magnets by the pulsed field from said plurality of conductor segments on said movable member.

17. An impulse drive device comprising an X stator and a Y stator, each being generally planar and each including means for producing a plurality of regions of magnetic field extending substantially perpendicularly from a first stator surface, said regions being regularly spaced apart in the plane of said stator, the regions of said X stator being parallel to the Y direction and the regions of said Y stator being parallel to the X direction, said X and Y stators being supported in planar parallel relationship;

a generally planar movable member disposed intermediate said stators for movement in a direction parallel thereto, said movable member including a plurality of electrically conductive segments on each surface, the segments on each surface being distributed substantially parallel to each other and to said regions of magnetic field on the facing stator, the segments of each plurality being electrically connected and having a spacing between immediately adjacent segments substantially equal to the spacing of said regions of magnetic field;

X pulse sequence generating means for generating sequences of X-drive current pulses and for delivering the same to the electrically conductive segments facing the X stator so that the passage of current pulses through each of said plurality of segments interacts with adjacent ones of said plurality of X stator regions of magnetic field to generate motion of said movable member parallel to the plane of said X stator from any of a plurality of predetermined initial positions of said movable member with respect to said stator to any of a plurality of predetermined final positions of said movable member with respect to said stator; and Y pulse sequence generating means for generating sequences of Y-drive current pulses and for delivering the same to the electrically conductive segments facing the Y stator so that the passage of current pulses through each of said plurality of segments interacts with adjacent ones of said plurality of Y stator regions of magnetic field to generate motion of said movable member parallel to the plane of said Y stator from any of a plurality of predetermined initial positions of said movable member with respect to said stator to any of a plurality of predetermined final positions of said movable member with respect to said stator.

18. The impulse drive device of claim 17 wherein each sequence of current pulses has a first portion in which each pulse has a first polarity such that its interaction with said regions of magnetic field accelerates said movable member, and a second portion in which each pulse has an opposite polarity such that its interaction with said regions of magnetic field decelerates said movable member.

19. The impulse drive device of claim 18 further including servo control means for final positioning of said slidor following the final pulse of said sequence.

20. The impulse drive device of claim 17 further including means for sensing the position of each said plurality of electrically conductive segments relative to the adjacent plurality of regions of magnetic field and providing output signals relating thereto; said pulse sequence generating means including a pulse generator and a controller, said controller being connected to receive said output signals as an input and to cause said pulse generator to generate the current pulses of the sequence only at times of predetermined registration of each of said electrically conductive segments with one of said regions of magnetic field.

21. The impulse drive device of claim 20 wherein said position sensing means comprise first and second series of spaced apart electrical conductors supported, respectively, on said X stator and said Y stator parallel to said elongate regions of magnetic field and having substantially the same spacing, means for supplying alternating current to each said plurality of electrically conductive segments on said movable member at a frequency substantially greater than the frequency of current pulses in any of said sequences of current pulses, and means for sensing changes in an electrical parameter of said series of conductors on each said stator in response to said high frequency current as said movable member moves with respect to each said stator.

22. The impulse drive device of claim 20 wherein each sequence of current pulses has a first portion in which each pulse has a polarity such that its interaction with said regions of magnetic field accelerates said movable member, and a second portion in which each pulse has a polarity such that its interaction with said regions of magnetic field decelerates said movable member,
   said pulse sequence generating means operative, in response to the output signals of said means for sensing the position of said movable member, for each sequence to generate the individual current pulses of the first portion when each of said electrically conductive segments is in predetermined registration with a trailing portion, in the direction of travel of said movable member, of a region of magnetic field and to generate the current pulses of the second portion when each of said electrically conductive segments is in predetermined registration with the leading portion of a region of magnetic field.

23. The impulse drive device of claim 22 further including servo control means for final positioning of said slidor following said second portion of said sequence.

24. The impulse drive device of claim 23 wherein said servo control means include velocity servo control means, position servo control means, and means responsive to said position sensing means for rendering operative either said velocity servo control means or said position servo control means.

25. The impulse drive device of claim 17 wherein said plurality of electrically conductive segments on said movable member are connected to each other to form a series electrical connection.

26. The impulse drive device of claim 17 further including contact brush means on said movable member in electrical contact with those electrically conductive segments.

27. The impulse drive device of claim 26 wherein said contact brush means are disposed outside of the geographical region of said electrically conductive segments.

28. The impulse drive device of claim 17 wherein each said stator includes an array of alternating permanent magnets and pole pieces, said regions of magnetic field extending substantially perpendicularly from said pole pieces.

29. The impulse drive device of claim 28 further including means for electromagnetically modifying the magnetic fields produced by permanent magnets.

30. The impulse drive device of claim 28 further comprising eddy current shielding means for preventing demagnetization of said permanent magnets by the pulsed field from said conductor segments on said movable member.

31. The impulse drive device of claim 17 wherein each said stator comprises an array of spaced-apart permanent magnets supported on a backing plate formed from a material having a high magnetic permeability, each said permanent magnet having a magnetization substantially perpendicular to the plane of movement of said movable member, each said permanent magnet oriented such that adjacent permanent magnets have surfaces facing said movable member which have opposite magnetic polarities.

32. The impulse drive device of claim 31 further including eddy current shielding means for preventing demagnetization of said permanent magnets by the pulsed field from said plurality of conductor segments on said movable member.

33. The impulse drive device of claim 17 wherein one of the group comprising (a) said X-drive current pulses and (b) said Y-drive current pulses is delivered to said movable member before the other, whereby the X-motion and the Y-motion of said movable member are sequential.

34. The impulse drive device of claim 17 wherein said X-drive current pulses and said Y-drive current pulses are delivered to said movable member at least partially simultaneously, whereby the X-motion and the Y-motion of said movable member are at least partially simultaneous so that at least a portion of the movement of said movable member is a path that is the resultant of the X-drive and the Y-drive.

35. The impulse drive device of claim 17 wherein the spacing of said X stator magnetic field regions is the same as the spacing of said Y stator magnetic field regions.

36. In a photocomposition apparatus comprising a light source, a media exposure station, an optical path between said light source and said exposure station, a type font transparency supportd in said optical path, and means for moving said transparency to bring individual type font characters of said transparency to the axis of said optical path,
   the improvement wherein said means for moving said transparency are an impulse drive device comprising
   an X stator and a Y stator, each being generally planar and including means for producing a plurality of regions of magnetic field extending substantially perpendicularly from a first stator surface, said regions being regularly spaced apart in the plane of said stator, the regions of said X stator being at an angle to the regions of said Y stator, said X and Y stators being supported in planar parallel relationship;
   a generally planar movable member disposed intermediate said stators for movement in a direction parallel thereto, said movable member including a plurality of electrically conductive segments on each surface, the segments on each surface being distributed substantially parallel to each other and to said regions of magnetic field on the facing stator, the segments of each plurality being electrically connected and having a spacing between immediately adjacent segments substantially equal to the spacing of said regions of magnetic field;

pulse sequence generating means for generating sequences of X-drive current pulses and sequences of Y-drive current pulses and for delivering the same to the electrically conductive segments facing the X stator and the Y stator, respectively, so that the passage of current pulses through each of said plurality of segments interacts with adjacent ones of said plurality of regions of magnetic field to generate motion of said movable regions of magnetic field to generate motion of said movable member in a direction parallel to the plane of said stator from any of a plurality of predetermined initial positions of said movable member with respect to said stator to any of a plurality of predetermined final positions of said movable member with respect to said stator; and means for sensing the position of each said plurality of electrically conductive segments relative to the adjacent plurality of regions of magnetic field and providing output signals relating thereto;

said pulse sequence generating means including a pulse generator and a controller, said controller being connected to receive said output signals as an input and to cause said pulse generator to generate the current pulses of the sequence at the times of predetermined registration of each of said electrically conductive segments with one of said regions of magnetic field.

37. An impulse drive device comprising a generally planar stator including means for producing a plurality of regions of magnetic field extending substantially perpendicularly from a first stator surface, said regions being regularly spaced apart in the plane of said stator;

a generally planar movable, member supported adjacent parallel to and perpendicularly displaced from said first stator surface for movement in a direction parallel thereto, said movable member including a plurality of electrically conductive segments distributed substantially parallel to each other and to said regions of magnetic field, said segments being electrically connected and having a spacing between immediately adjacent segments in the plane of said movable member substantially equal to the spacing of said regions of magnetic field;

pulse sequence generating means for generating sequences of current pulses and for delivering the same to said plurality of electrically conductive segments, and means for controlling the timing, polarity and width of each pulse in said sequence.

38. Apparatus in accordance with claim 37 wherein said pulses are timed to pass through said segments when said segments are in a specific spatial relationship to individual ones of said regions of magnetic field.

39. Apparatus in accordance with claim 38 wherein pulses of a first polarity are timed to pass through segments when the segments are in registration with the trailing edge of said magnetic field region during acceleration and pulses of opposite polarity are timed to pass through the segments when the seqments are in registration with the leading edge of said magnetic field regions during deceleration.

40. Apparatus in accordance with claim 37 wherein the velocity of said movement is controlled by the width of said pulses.

41. Apparatus in accordance with claim 38 wherein said pulse widths are less than the time required for any segment to move from a specific spatial relation ahead of one magnetic region to the same spatial relation following the same magnetic region.

42. Apparatus in accordance with claim 37 wherein said plurality of electrically conductive segments are serially connected to form a generally serpentine conductor.

43. Apparatus in accordance with claim 42 and further including at least one additional serpentine conductor aligned with but displaced in a direction perpendicular to the plane of movement from said serpentine conductor, said additional serpentine conductor being electrically connected either in series or in parallel with said serpentine conductor.

44. In a photocomposition apparatus comprising a light source, a media exposure station, an optical path between said light source and said exposure station, a type font transparency supported in said optical path, and means for moving said transparency to bring individual type font characters of said transparency to the axis of said optical path, the improvement wherein said means for moving said transparency are an impulse drive device comprising an X stator and a Y stator, each being generally planar and including means for producing a plurality of regions of magnetic field extending substantially perpendicularly from a first stator surface, said regions being regularly spaced apart in the plane of said stator, the regions of said X stator being at an angle to the regions of said Y stator, said X and Y stators being supported in planar parallel relationship;

a generally planar movable member disposed intermediate said stators for movement in a direction parallel thereto, said movable member including a plurality of electrically conductive segments on each surface, the segments on each surface being distributed substantially parallel to each other and to said regions of magnetic field on the facing stator, the segments of each plurality being electrically connected and having a spacing between immediately adjacent segments substantially equal to the spacing of said regions of magnetic field;

pulse sequence generating means for generating sequences of X-drive current pulses and sequences of Y-drive current pulses and for delivering the same to the electrically conductive segments facing the X stator and the Y stator, respectively, so that the passage of current pulses through each of said plurality of segments interacts with adjacent ones of said plurality of regions of magnetic field to generate motion of said movable member in a direction parallel to the plane of said stator from any of a plurality of predetermined initial positions of said movable member with respect to said stator to any of a plurality of predetermined final positions of said movable member with respect to said stator; and means for sensing the position of each said plurality of electrically conductive segments relative to the adjacent a plurality of regions of magnetic field and providing output signals relating thereto;

said pulse sequence generating means including a pulse generator and a controller, said controller being connected to receive said output signals as an input and to cause said pulse generator to generate the current pulses of the sequence at the times of predetermined registration of each of said electrically conductive segments with one of said regions of magnetic field, and wherein characters on said type font transparency are disposed in spaces between adjacent conductive segments.

* * * * *

UNITED STATES PATENT AND TRADEMARK OFFICE
CERTIFICATE OF CORRECTION

PATENT NO. : 4,230,978
DATED : October 28, 1980
INVENTOR(S) : John F. Gardella, Jr., et al It is certified that error appears in the above-identified patent and that said Letters Patent are hereby corrected as shown below:

Column 1, line 40 "the" should be --and--;

Column 2, line 42 "sgements" should be --segments--;

Column 5, line 36 "wher" should be --where--;

Column 12, line 14 "perpendicular" should be --perpendicularly--;

Column 16, line 3 before "permanent" insert --said--;

Column 16, line 45 "supportd" should be --supported--.

Column 6, line 13, "betweeen" should be --between--;

Column 8, line 27, delete the word "would".

Signed and Sealed this

Eleventh Day of August 1981

[SEAL]

Attest:

Attesting Officer

GERALD J. MOSSINGHOFF

Commissioner of Patents and Trademarks